(12) United States Patent
Webber et al.

(10) Patent No.: US 6,324,601 B1
(45) Date of Patent: *Nov. 27, 2001

(54) DATA STRUCTURE AND METHOD FOR MANAGING MULTIPLE ORDERED SETS

(75) Inventors: Thomas P. Webber, Petersham, MA (US); Paul A. Wilcox, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/513,298

(22) Filed: Feb. 25, 2000

Related U.S. Application Data

(63) Continuation of application No. 08/885,010, filed on Jun. 30, 1997, now Pat. No. 6,035,348.

(51) Int. Cl.[7] .................... G06F 12/02; G06F 12/00; G06F 9/22; G06F 5/06; H04J 3/16

(52) U.S. Cl. .................... 710/54; 710/52; 710/113; 711/110; 711/147; 712/245; 370/474; 370/235; 370/400; 370/362; 370/395

(58) Field of Search .................... 710/54, 52, 113; 711/110, 147; 712/245; 370/235, 400, 362, 395, 474

(56) References Cited

U.S. PATENT DOCUMENTS

| | | | |
|---|---|---|---|
| 4,835,738 | | 5/1989 | Neihaus et al. . |
| 5,043,981 | * | 8/1991 | Firoozmand et al. ............... 370/235 |
| 5,136,582 | * | 8/1992 | Firoozmand ......................... 370/400 |
| 5,333,276 | | 7/1994 | Solari . |
| 5,363,485 | * | 11/1994 | Nguyen et al. ...................... 710/113 |
| 5,572,698 | * | 11/1996 | Yen et al. ............................. 711/110 |
| 5,666,494 | | 9/1997 | Mote, Jr. . |
| 5,673,427 | * | 9/1997 | Brown et al. ........................ 712/245 |
| 5,777,994 | * | 7/1998 | Takihiro et al. ...................... 370/395 |
| 5,881,265 | | 3/1999 | McFarland et al. . |
| 5,898,688 | * | 4/1999 | Norton et al. ......................... 370/362 |
| 5,936,967 | * | 8/1999 | Baldwin et al. ...................... 370/474 |
| 6,035,348 | * | 3/2000 | Webber et al. ........................ 710/54 |

FOREIGN PATENT DOCUMENTS

| | | | |
|---|---|---|---|
| 0 369 920 | | 5/1990 | (EP) . |
| 0459757A2 | * | 12/1991 | (EP) ............................... G06F/5/06 |

OTHER PUBLICATIONS

IBM TDB, Circular Queueing, Jul. 1983, V. 26 No. 2, pp. 565–566.*

(List continued on next page.)

Primary Examiner—Thomas Lee
Assistant Examiner—Katharina Schuster
(74) Attorney, Agent, or Firm—Conley, Rose & Tayon, PC; B. Noël Kivlin

(57) ABSTRACT

A turnstile FIFO stores data packet from each of a number of separate ordered sets in a generally circular list structure. A select data packet can be dequeued if no older data packet of the same ordered set is stored in the turnstile FIFO. The data packets are stored in the turnstile FIFO in a globally sequential order such that older data packets precede younger data packets regardless of membership in the one or more ordered sets. Turnstile logic determines whether the selected data packet is the oldest data packet of a given ordered set by determining set membership of all older data packets stored in the turnstile FIFO. Older data packets are stored in positions within the turnstile FIFO which precede the position of the selected data packet. If no older data packet is a member of the same set of which the selected data packet is a member, the selected data packet can be dequeued from the turnstile FIFO without violated the sequential order of data packets of the ordered set to which the data packet belong. Conversely, if an older data packet is of the same ordered set, the selected data packet cannot be dequeued. A turnstile FIFO according to the present invention can be particularly useful in routing traffic within a crossbar between various devices.

16 Claims, 10 Drawing Sheets

OTHER PUBLICATIONS

IBM TDB, Multiuser/Multidevice–Oriented Queueing, Oct. 1983, V. 26, No. 5, pp. 2548–2550.*

IBM TDB, Multi–Access First–In–First–Out Queue Using 370 Compare and Swap, Feb. 1993, V. 36 No. 2, pp. 327–330.*

IBM TDB, Paralleling Links in a Unified Switching Architecture for Circuit/Packet, Feb. 1990, V. 32 No. 9A, pp. 45–49.*

IBM TDB, Multiple FIFOs for Improved Context Switching in Graphics Adapters, Jun. 1992, V. 35 No. 1B, pp. 163–164.*

IBM TDB, First–In–First–Out Queuing in Single Stage Switching Networks Built from Multiple Identical Packet Switching Modules, Nov. 1993, V. 36 No. 11, pp. 517–520.*

IBM TDB, Suspended Operation Restart in Queued System, May 1990, V. 32 No. 12, pp. 386–388.*

"Suspended Operation Restart in Queued System," IBM Technical Disclosure Bulletin, May 1990, pp. 386–388.

* cited by examiner

DATA STRUCTURE AND METHOD FOR MANAGING MULTIPLE ORDERED SETS

This application is a continuation of U.S. patent application Ser. No. 08/885,010, entitled "Method for Managing Multiple Ordered Sets Dequeuing Selected Data Packet from Single Memory Structure," filed Jun. 30, 1997, now U.S. Pat. No 6,035,348.

FIELD OF THE INVENTION

The present invention pertains to first in, first out memory systems. More particularly, the present invention relates to a method and apparatus for managing multiple ordered sets in a single memory system.

BACKGROUND OF THE INVENTION

A first in, first out memory system (FIFO) is a memory system from which data items are retrieved in the same sequence in which the data items were stored in the memory system. That is, the first data item stored in a FIFO is the first data item that is retrieved from the FIFO.

FIFO's are commonly used as data rate buffers between systems that transfer data at widely different rates. For example, multiple systems which process and transfer data at widely different rates can be interconnected through an interconnect such as a crossbar. A FIFO can be used to buffer data transferred from a fast device to a slow device, for example, from a computer to a printer. The computer can send character data to a FIFO at a relatively high rate. The printer can then read the data from the FIFO at a much slower rate and in the same order that the data was sent by the computer. Similarly, a FIFO can be used to buffer data transferred from a slow device to a fast device, e.g., from a keyboard to a computer. Here, the keyboard can send character data to a FIFO at a relatively low rate. The computer can then read the data from the FIFO at a much higher rate and in the order that the data was sent by the keyboard. Therefore, the computer may perform other tasks while the FIFO is slowly being filled with data and later retrieve the data from the FIFO in order.

A FIFO implemented in hardware, e.g., in an integrated computer, typically includes a finite number of memory positions into which data items can be stored. Each memory position can be, for example, a register. In general, each memory position of the FIFO can store a single data item. Each data item typically has a fixed length, but some FIFOs store data items of variable length.

Many applications require buffering of multiple ordered sets, or multiple sets of data items. In such applications, sequential ordering of data items are generally only important among data items of the same set. One such example is a scheduler that spools task sets for multiple processors. The scheduler can compile an ordered set of packets for each processor and each processor can sequentially execute a task set which includes the ordered set of packets specific to the processor. Therefore, it is important to maintain sequential ordering of packets within each ordered set for each processor. But, it is not necessary to maintain sequential ordering of packets among the plurality of ordered sets.

One method of buffering data entries of multiple ordered sets is to sort the data entries into multiple, separate FIFO's, i.e., one for each ordered set. In some applications, e.g., when multiple FIFO's are implemented in hardware, it is necessary to pre-allocate memory space for such FIFO's and therefore to fix a maximum number of FIFO's and a maximum number of memory positions for each such FIFO. In systems which use multiple FIFO's, the number of FIFO's and the maximum requisite length of each FIFO can be particularly difficult to predict and can depend upon the manner in which such systems are used. Fixing the maximum number of FIFO's too low increases the likelihood that such a system finds insufficient FIFO's to operate properly. Fixing the maximum number of FIFO's too high allocates more memory, and therefor more circuitry, than is necessary for implementation of the multiple FIFO's. In addition, one of a number of FIFO's of fixed length can exhaust available memory positions while other FIFO's have a surplus of memory positions. Accordingly, fixing the number of FIFO's and the number of memory positions for each FIFO can result in a memory position shortage in one FIFO and a simultaneous memory position surplus in other FIFO's.

Some attempts have been made to implement multiple ordered sets in a single FIFO. However, such can result in a problem known as blocking. Blocking refers to the unavailability of data items of one ordered set stored in a FIFO as a result of storage of a data item of another ordered set in a preceding memory in the order of the FIFO. The following example is illustrative. Suppose a scheduler collects packets into respective ordered sets representing respective tasks to be performed by respective processors. Suppose further that the packets are spooled through a single FIFO regardless of the particular processor which is to receive each packet. If packets intended for a first processor follow packets intended for a second processor in the sequence of the single FIFO, the packets intended for the first processor cannot be sent to the first processor until the preceding packets for the second processor are sent. If the second processor is busy and cannot receive the packets from the FIFO, the packets intended for the first processor are blocked. Even if the first processor is ready to receive packets from the FIFO, the packets are blocked pending receipt of the preceding packets by the second processor. Accordingly, the first processor is idle and wasted as long as the second processor is busy. Thus, blocking leads to unnecessarily wasted resources and time.

What is needed is a method and apparatus for buffering data entries of multiple ordered sets without a need to allocate an excess of FIFO's or slots per FIFO and in a manner such that blocking of an oldest data entry which is a member of one set does not cause excessive delay in release of oldest data entries of other sets from the FIFO.

SUMMARY OF THE INVENTION

In accordance with the present invention, a method and apparatus for managing multiple ordered sets of data entries in a circular memory structure is provided. A circular memory structure according to the present invention is sometimes referred to as a turnstile FIFO. Multiple ordered sets of data packets are stored in the turnstile FIFO. The turnstile FIFO is managed such that blocking of an oldest packet which is a member of one set does not cause excessive delay in dequeuing oldest packets which are members of other sets. Processing multiple ordered sets according to the present invention safely preserve sequential order among packets which are members of a same set.

Each packet includes a set identifier which specifies one of the multiple ordered sets stored in the turnstile FIFO. Accordingly, the turnstile FIFO can include as few as one ordered set or as many distinct and separate ordered sets as can be uniquely identified by the range of values of the set identifier. Conventional FIFO systems require pre-allocating a number of FIFO's, each of which is pre-allocated at a maximum size. However, storing all packets at a single turnstile FIFO allows a moderately sized turnstile FIFO to store a few long ordered sets, many short ordered sets, or a combination of both.

Operations performed on the turnstile FIFO include enqueue, dequeue, and rotate. The enqueue operation adds a new packet to the turnstile FIFO in such a way that preserves the sequential order of the packets of the selected set within the turnstile FIFO. The dequeue operation retrieves an oldest packet of a set stored in the turnstile FIFO which is not currently blocked from being dequeued.

Specifically, a data packet is dequeued from a position within the turnstile FIFO only if the data packet is the oldest data packet stored in the turnstile FIFO of the particular ordered set to which the data packet belongs. Turnstile logic determines whether the data packet is the oldest of its particular ordered set by determining the ordered set to which each older data packets of the turnstile FIFO belongs. Since the data packets of the turnstile FIFO are stored in the same sequence in which the data packets are added to the turnstile FIFO, all data packets which are older than the selected data packet are stored at preceding positions within the turnstile FIFO up to and including the head data packet. The head data packet is the oldest of all data packets stored in the turnstile FIFO regardless of ordered set membership and is tracked by the turnstile logic. For each data packet older than the selected data packet within the turnstile FIFO, the set to which the older data packet belongs is compared to the set to which the selected data packet belongs.

If one or more of the older data packets belong to the same set to which the selected data packet belongs, the selected data packet is not the oldest data packet of the ordered set and therefore cannot be dequeued without violating the sequence of data packet dequeuing within the ordered set. Conversely, if no older data packet belongs to the same set to which the selected data packet belongs, the selected data packet is the oldest data packet of its particular ordered set and can therefore be dequeued.

The turnstile FIFO according to the present invention provides the performance efficiencies of separate FIFO's for each of a number of ordered sets while simultaneously providing the flexibility of a single FIFO for storing data packets of multiple ordered sets.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following detailed description of an illustrative embodiment of the present invention, an apparatus and method for managing multiple ordered sets in a turnstile FIFO 100 (FIG. 1A), numerous specific details are set forth in order to provide a thorough understanding of the present invention. However, it will be obvious to one skilled in the art that the present invention can be practiced without these specific details or by using alternate elements or processes. In other instances well known processes, procedures, components, and circuits have not been described in detail so as not to unnecessarily obscure aspects of the present invention.

A circular memory structure according to the present invention is sometimes referred to as a turnstile FIFO 100. Multiple ordered sets of data packets are stored in turnstile FIFO 100. Turnstile logic 220 (FIGS. 2A–2F) implements a rotate mechanism which enables management of multiple ordered sets such that the presence of an oldest packet which is a member of one set does not cause excessive delay in de-queuing oldest data packets which are members of other sets. According to the present invention, turnstile FIFO 100 safely preserves sequential order among data packets which are members of a same set yet stores packets of multiple ordered sets in the single structure of turnstile FIFO 100.

Figure 1A:
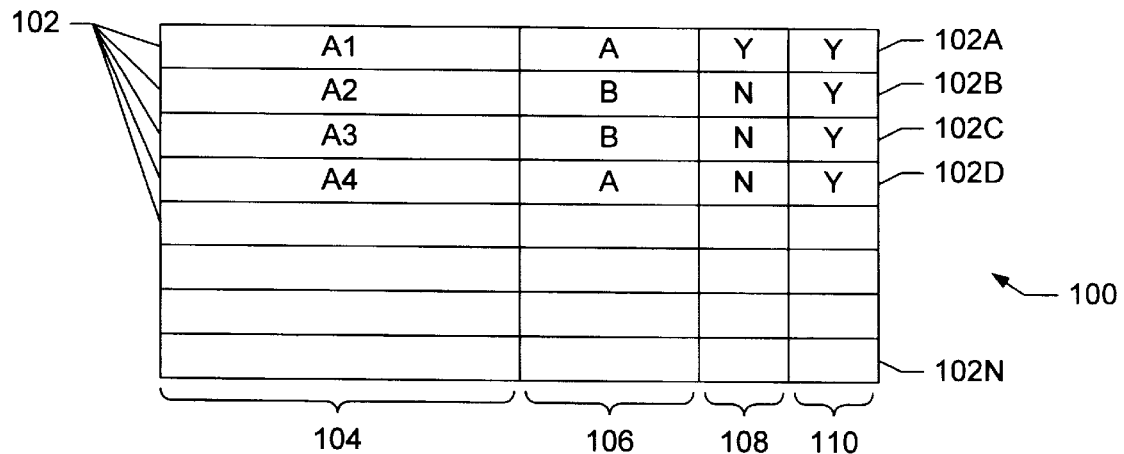
FIG. 1A is a block diagram of slots of a circular memory structure according to a first embodiment of the present invention for managing multiple ordered sets.

FIG. 1A shows turnstile FIFO 100 according to an embodiment of the present invention. Turnstile FIFO 100 is a circular memory structure which includes a number of slots 102. Turnstile FIFO 100 is circular in that slots 102 are logically ordered and the first ordered slot, i.e., slot 102A, immediately follows the last ordered slot, i.e., slot 102N. Such is illustrated, for example, in FIGS. 2A–F. Turnstile FIFO 100 is shown in tabular form in FIG. 1A–B to more clearly illustrate each of the fields of slots 102, each of which includes sufficient memory to store a respective packet. In an embodiment of the present invention, each of slots 102 is a register.

Each of slots 102 includes a data field 104, a set identifier field 106, a head field 108 and a valid field 110. Each of fields 104–110 stores data representing a particular piece of information related to a particular data packet. Fields 104–110 are sometimes collectively referred to as tags. Data field 104 stores the data packet which is the substantive data stored and managed within a particular one of slots 102. Set identifier 106 specifies the one of the multiple ordered sets stored in turnstile FIFO 100 to which a particular data packet belongs. Since a single structure stores all packets of multiple ordered sets, turnstile FIFO 100 can store data packets of as few as one ordered set or as many distinct and separate ordered sets as can be uniquely identified by the range of values of set identifier 106. In addition, each of slots 102 can store a data packet of any of the distinct and separate ordered sets. Accordingly, turnstile FIFO 100 can be moderately sized yet store a few particularly long ordered sets, many short ordered sets, or a combination of both.

Header field 108 stores data, e.g., a single bit, which indicates whether a particular one of slots 102 stores the head data packet. The head data packet is the oldest of all data packets stored in turnstile FIFO 100. Valid field 110 stores data, e.g., a single bit, which indicates whether a particular one of slots 102 stores a valid data packet and is therefore not available for storage of another data packet.

Figure 1B:
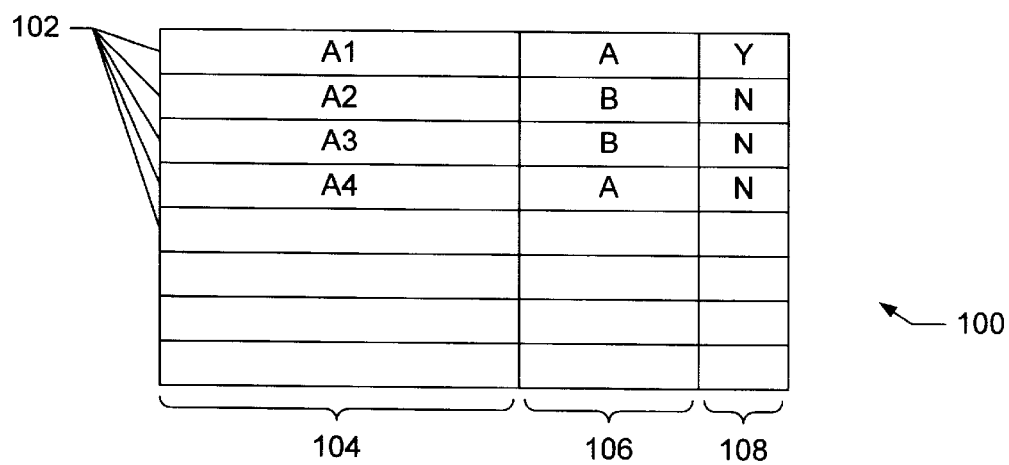
FIG. 1B is a block diagram of slots of a circular memory structure according to a second embodiment of the present invention for managing multiple ordered sets.

With reference to FIG. 1B, a block diagram representing an alternative embodiment of turnstile FIFO 100 is shown. In this embodiment, valid tag 110 (FIG. 1A) is not required. Instead, a unique ordered set identifier is reserved to represent an invalid packet entry. If set field 106 of a slot, e.g., slot 102A, stores data representing the reserved ordered set, slot 102A does not store a valid data packet and is available for storage of a new data packet.

Turnstile logic 220 (FIG. 2A) manages one or more ordered sets of data packets stored in turnstile FIFO 100 using enqueue, dequeue, and rotate operations. Performance of the enqueue operation adds a new packet to turnstile FIFO 100 in such a way that preserves the sequential order of the packets of the selected set within turnstile FIFO 100. Performance of the dequeue operation retrieves an oldest data packet of a selected ordered set of data packets stored in turnstile FIFO 100 in such a way that data packets of other ordered sets cannot block the retrieval of the oldest data packet of the selected ordered set.

Figure 4:
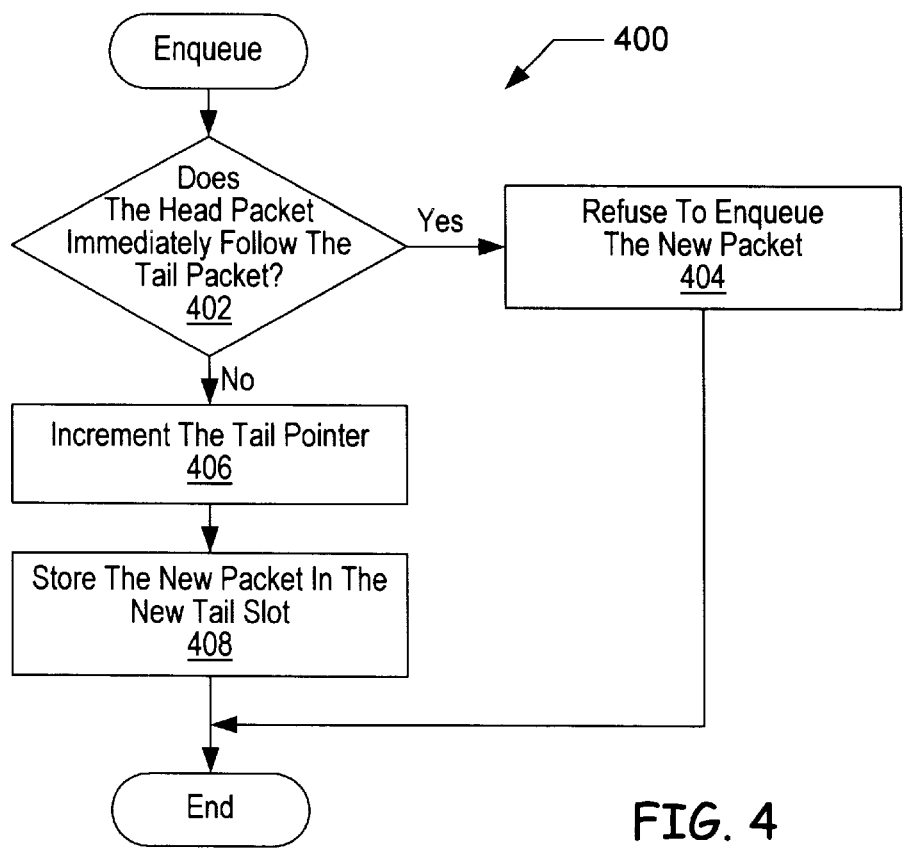
FIG. 4 is a block diagram of the enqueuing data packets of ordered sets in a single circular memory structure in accordance with principles of the present invention.

The enqueuing of a data packet into turnstile FIFO 100 is illustrated as logic flow diagram 400 (FIG. 4). Prior to performance of the steps of logic flow diagram 400, turnstile FIFO 100 has a prior state in which turnstile FIFO 100 stores data packets A1, A2, B1, and B2. Data packets A1 and A2 are from a set generally designated as "A," and data packet A1 is older than, i.e., was stored in turnstile FIFO 100 prior to, data packet A2. Similarly, data packets B1 and B2 are from a set generally designated as "B," and data packet B1 is older than, i.e., was stored in turnstile FIFO 100 prior to, data packet B2. In this illustrative example of enqueuing a data packet according to logic flow diagram 400 (FIG. 4), turnstile FIFO 100 (FIG. 2A) stores the following data packets in the following order: A1, B1, B2, A2.

Figure 2A:
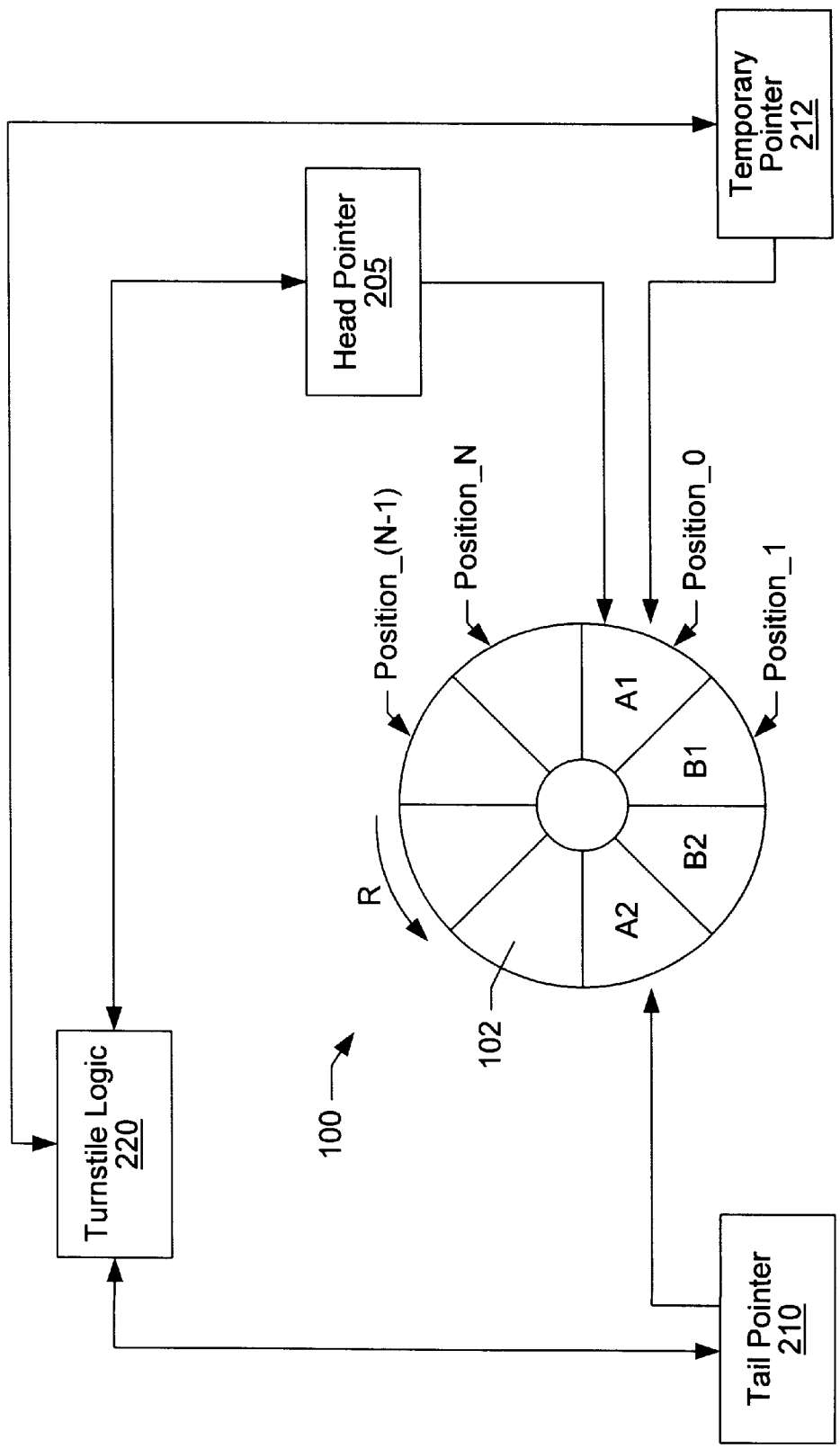
FIG. 2A is a block diagram of a circular memory structure, according to principles of the present invention for managing multiple ordered sets, in an initial state.

Turnstile FIFO 100 generally has three (3) significant slots of slots 102 which are used by turnstile logic 220 to manage data packets in turnstile FIFO 100. Specifically, a tail slot stores a tail data packet which is the data packet most recently stored in turnstile FIFO 100, a head slot stores a head data packet which is the data packet least recently stored in turnstile FIFO 100, and a slot at position zero. The slot at position zero is the only slot from which a data packet can be dequeued in accordance with an illustrative embodiment of the present invention. In one embodiment, the tail slot is located dynamically by turnstile logic 220 by determining which of slots 102 is valid and is immediately followed by an invalid slot as indicated by valid field 110 of each of slots 102 or is immediately followed by the head slot. Alternatively, a tail pointer 210 points to the tail slot. The head slot is the one of slots 102 in which head field 108 (FIG. 1A) of the slot so indicates. Alternatively, a head pointer 205 points to the head slot. The slot at position zero can be fixed within turnstile FIFO 100 as shown in FIG. 2A or, alternatively, can be identified by a position zero pointer (not shown).

In test step 402 (FIG. 4) in which processing according to logic flow diagram 400 begins, turnstile logic 220 (FIG. 2A) determines whether the head slot immediately following the tail slot in turnstile FIFO 100. If so, turnstile FIFO 100 is full and processing transfers to step 404 in which turnstile logic 220 (FIG. 2A) refuses to enqueue the subject data packet. Turnstile logic 220 can communicate such refusal to the source of the subject data packet in any conventional manner. Conversely, if the head slot does not immediately follow the tail slot, processing transfers from test step 402 (FIG. 4) to step 406.

In step 406, turnstile logic 220 (FIG. 2A) increments the position of the tail slot by one. It should be noted that, since turnstile FIFO 100 is circular, the first of slots 102 immediately follows the last of slots 102. Thus, the slot at position N immediately precedes the slot at position zero. Accordingly, if the tail slot is at position N, the tail slot is at position zero after performance of step 406 (FIG. 4). In one embodiment, turnstile logic 220 (FIG. 2A) increments the tail slot position by setting valid field 110 in the one of slots 102 immediately following the tail slot to indicate that the slot is now valid and is now the new tail slot. The new tail slot is so identified by the fact that the immediately following slot is either invalid or is the head slot. In an alternative embodiment, turnstile logic 220 increments the position of the tail slot by adjusting tail pointer 210 to point to the slot immediately following the previous tail slot.

In step 408 (FIG. 4), turnstile logic 220 (FIG. 2A) stores the subject packet in the new tail slot. Specifically, turnstile logic 220 stores the subject packet in data packet field 104 of the new tail slot. For example, in enqueuing data packet B3 (FIG. 2B), turnstile logic 220 increments tail pointer 210 and stores data packet B3 in the new tail slot as shown. Since data packets are enqueued onto turnstile FIFO 100 in the same sequence in which such data packets are received by turnstile logic 220, the sequence of data packets within each ordered set is inherently preserved.

Logic flow diagram 300 (FIG. 3) illustrates the dequeuing of data packets from turnstile FIFO 100 (FIG. 2B) by turnstile logic 220 in one embodiment of the present invention. In this illustrative embodiment, turnstile logic 220 does not wait for requests to dequeue data packets from specific ordered sets but instead perpetually attempts to dequeue all data packets from turnstile FIFO 100 and deliver each such data packet to a recipient identified in the data packet, e.g., by set identifier field 106. Such is appropriate, for example, if turnstile logic 220 and turnstile FIFO 100 are used to route traffic between multiple systems coupled through a crossbar switch. In that case, turnstile logic 220 perpetually attempts to deliver data packets stored in turnstile FIFO 100 to respective recipients and generally only fails when the recipient is busy or otherwise unavailable to receive the data packets.

In step 302 with which processing according to logic flow diagram 300 begins, turnstile control logic 220 (FIG. 2B) retrieves the tags of the current packet zero. As used herein, packet zero is the data packet stored in the slot at position zero, e.g., data packet A1 in FIG. 2B. Processing transfers to test step 303 (FIG. 3) in which turnstile logic 220 (FIG. 2B) determines whether packet zero is valid by comparison of data stored in valid field 110 (FIG. 1A) to data so indicating. If packet zero is not valid, processing transfers to step 316 (FIG. 3) which is described below and in which turnstile logic 220 (FIG. 2B) rotates turnstile FIFO 100 to process the next data packet in the manner described more completely below. Conversely, if packet zero is valid, processing transfers from test step 330 to test step 304. In test step 304, turnstile logic 220 (FIG. 2B) determines whether packet zero is the head packet. Turnstile logic 220 makes such a determination by comparison of data stored in head field 108 (FIG. 1A) of packet zero to data so indicating or, alternatively, by determining whether head pointer 205 points to position zero.

If packet zero is the head packet, packet zero is necessarily the oldest packet stored in turnstile FIFO 100 and can therefore be dequeued without violating the particular sequence with which data packets are added to turnstile FIFO 100. Accordingly, processing transfers from test step 304 to test step 305. Conversely, if packet zero is not the head packet, turnstile logic 220 (FIG. 2B) must generally first determine that no older data packets of the same set are stored in turnstile FIFO 100 and processing transfers to step 306 (FIG. 3) which is described more completely below.

Figure 2B:
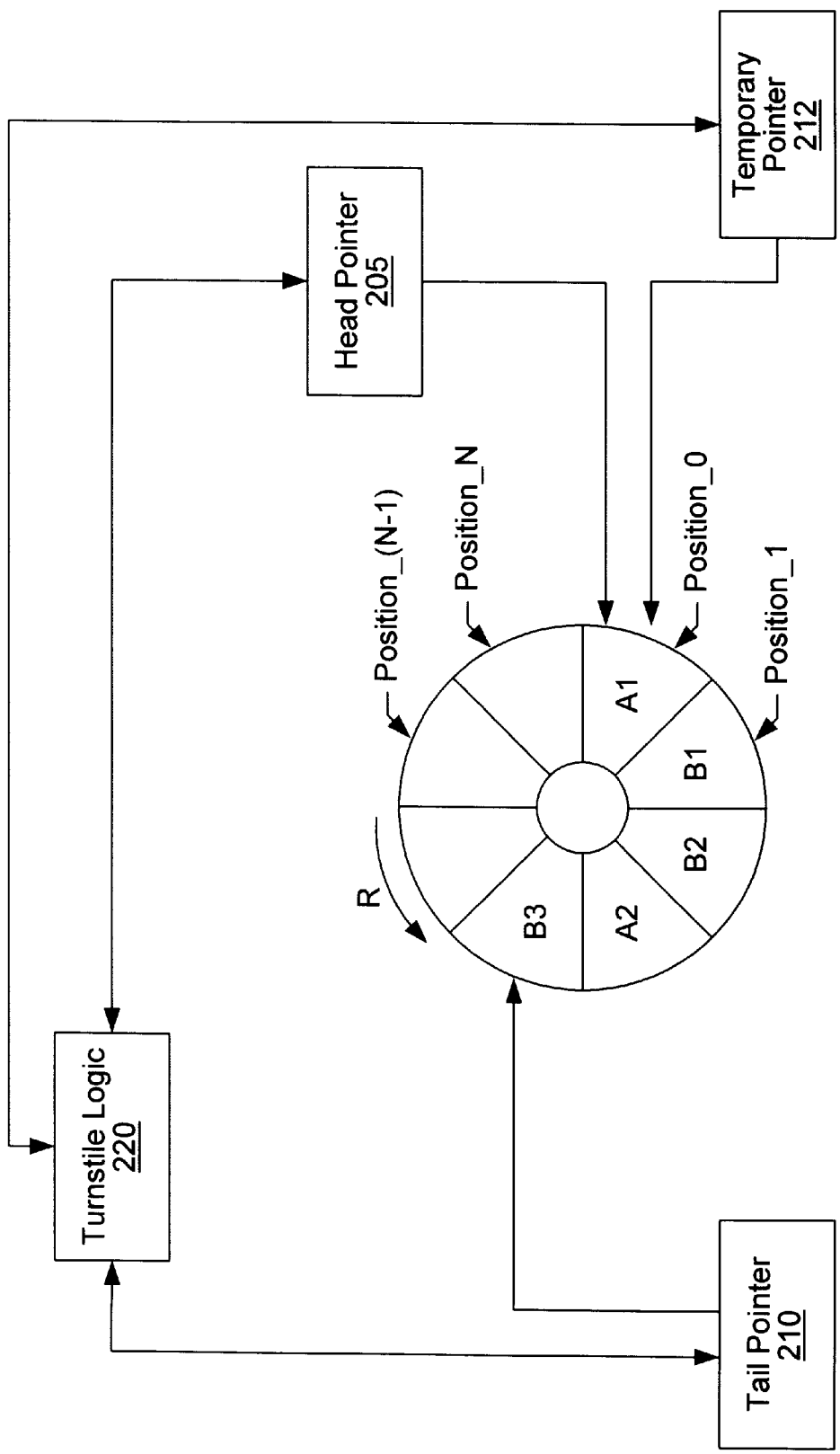
FIG. 2B is a block diagram of the circular memory structure of FIG. 2A after an enqueue operation in accordance with principles of the present invention.
Figure 3:
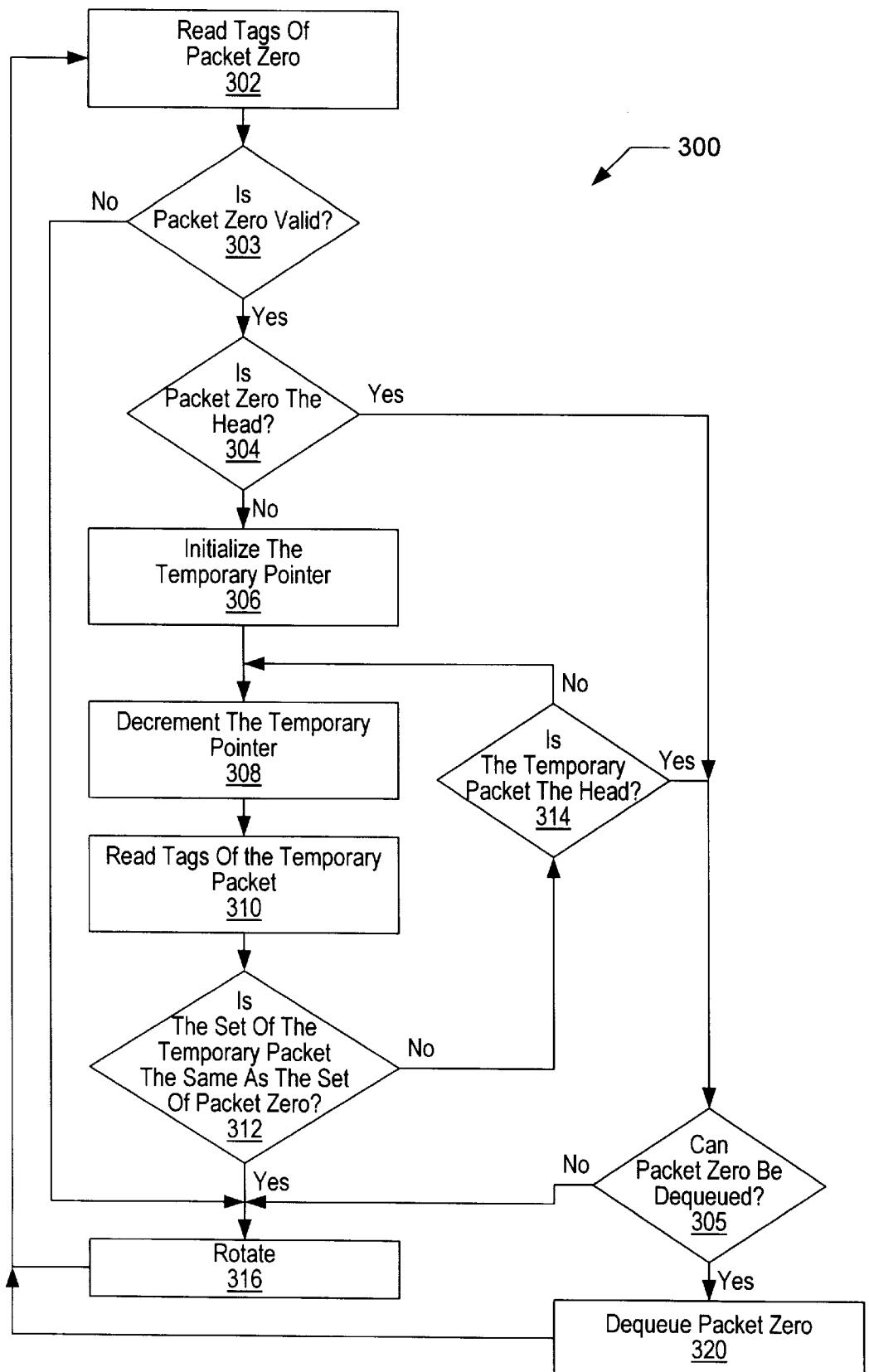
FIG. 3 is a logic flow diagram of the management multiple ordered sets in a circular memory structure according to principles of the present invention.
Figure 5:
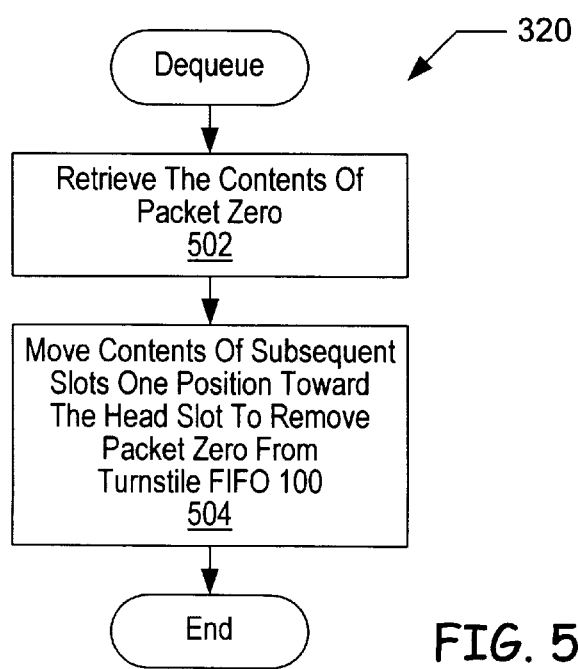
FIG. 5 is a block diagram of the dequeuing of a particular data packet from the single circular memory structure.

In the context of the state of turnstile FIFO 100 as shown in FIG. 2B, packet zero is data packet A1 and is the head packet. Accordingly, processing transfers to test step 305 (FIG. 3). In test step 305, turnstile logic 220 (FIG. 2B) determines whether packet zero can be dequeued. In this illustrative embodiment, a data packet can be dequeued if a recipient system to which the data packet is to be transferred is ready to receive the data packet. Turnstile logic 220 can make such a determination by communicating with the recipient system and identifies the recipient system by reference to data stored in set identifier field 106 of packet zero. In this illustrative example, turnstile logic 220 determines that packet zero, i.e., data packet A1, can be dequeued and proceeds to dequeue packet zero in step 320 (FIG. 3). Step 320 is shown in greater detail as logic flow diagram 320 (FIG. 5).

Figure 2C:
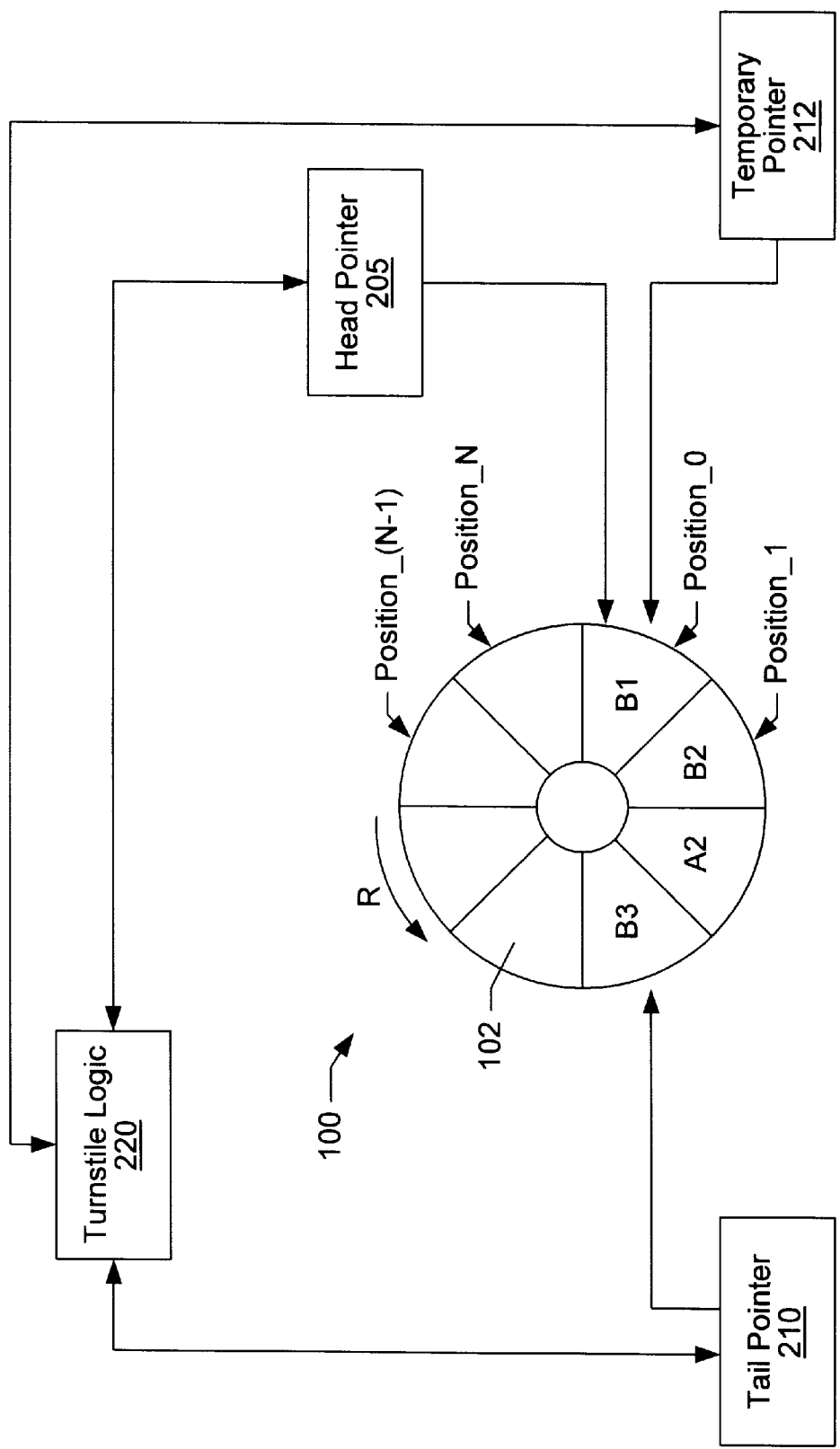
FIG. 2C is a block diagram of the circular memory structure of FIG. 2B after a dequeue operation in accordance with principles of the present invention.

In step 502, turnstile logic 220 (FIG. 2B) retrieves data stored in data packet field 104 (FIG. 1A) of packet zero and, in this illustrative embodiment, sends the retrieved data to the recipient which is identified by data stored in set identifier field 106 of packet zero. In step 504 (FIG. 5), turnstile logic 220 (FIG. 2B) moves each data packet stored in a slot in a position subsequent to packet zero to and including the tail packet in the direction of arrow R. It should be noted that data packets preceding packet zero up to and including the head packet are not moved. Thus, packet zero is removed from turnstile FIFO 100 and the subsequent data packets are moved to fill the one of slots 102 vacated by packet zero. Accordingly, the data packets which remain stored in turnstile FIFO 100 are stored in contiguous ones of slots 102. In addition, the data packet immediately following packet zero in the sequence of turnstile FIFO 100 becomes packet zero to thereby replace the previous packet zero in a subsequent performance of the steps of logic flow diagram 300 (FIG. 3). After step 504 (FIG. 5), processing according to logic flow diagram 320 (FIG. 3), and therefore step 320 (FIG. 3), completes. The resulting of dequeuing data packet A1 is shown in FIG. 2C.

Processing transfers from step 320 (FIG. 3) to step 302 which is described above. In this illustrative example, packet zero is now data packet B1 (FIG. 2C) as a result of dequeuing data packet A1 in step 320 (FIG. 3) as described above. Data packet B1 (FIG. 2C) is also the head packet, so processing transfers through test step 304 (FIG. 3) to test step 305. In this illustrative example, the recipient system of data packet B1 (FIG. 2C) is not ready to receive data packet B1 which therefore cannot be dequeued. Accordingly, processing transfers from test step 305 (FIG. 3) to step 316.

Figure 2D:
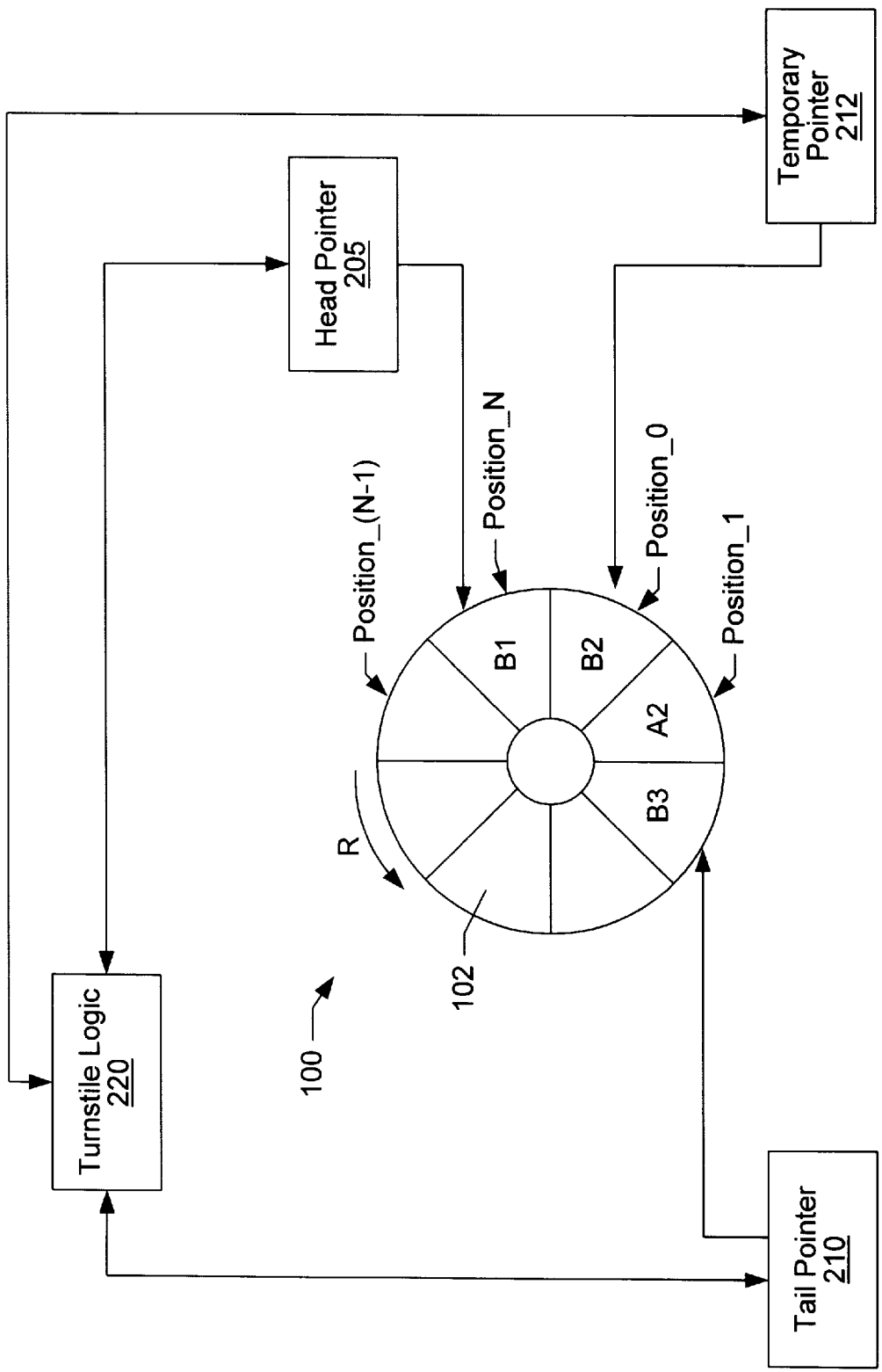
FIG. 2D is a block diagram of the circular memory structure of FIG. 2C after a first rotate operation in accordance with principles of the present invention.

In step 316, turnstile logic 220 (FIG. 2C) rotates turnstile FIFO 100 in the direction of arrow R such that the data packet immediately following packet zero in the sequence of turnstile FIFO 100 becomes packet zero. The result of such rotation is shown in FIG. 2D. Rotation is accomplished by physically shifting data stored in each packet into the adjacent slot in the direction of arrow R. Alternatively, rotation is accomplished by incrementing a position zero pointer (not shown) to point to the next one of slots 102 in the direction opposite arrow R. After rotation in step 416, data packet B2 is packet zero and is a candidate for being dequeued in step 320 (FIG. 3) in the manner described above. It should be noted that the head packet and tail packet do not change as a result of rotation. Data packet B1 is still the head packet, and data packet B3 is still the tail packet.

Processing transfers to step 302 and therefrom to test step 304. Since data packet B2 is not the head packet, must generally verify that no older packet of the same set as packet zero is stored in turnstile FIFO 100.

In steps 306–314, turnstile logic 220 (FIG. 2B) determines that no older data packets of the same set as packet zero are stored in turnstile FIFO 100. Specifically, turnstile logic 220 looks for another data packet which is of the same set as packet zero and which is positioned between position zero and the head slot. In step 306 (FIG. 3), turnstile logic 220 (FIG. 2B) initializes a temporary pointer 212 to point to position zero within turnstile FIFO 100. In step 308 (FIG. 3), turnstile logic 220 (FIG. 2B) decrements the temporary pointer. Thus, temporary pointer 212 now points to the one of slots 102 which immediately precedes the slot at position zero, i.e., the slot which stores data packet B1. Processing transfers to step 310 in which turnstile logic 220 reads the tags of the data packet stored in the slot to which temporary pointer 212 points, which is sometimes referred to herein as the temporary packet. In this illustrative example, data packet B1 is the temporary packet.

Figure 2E:
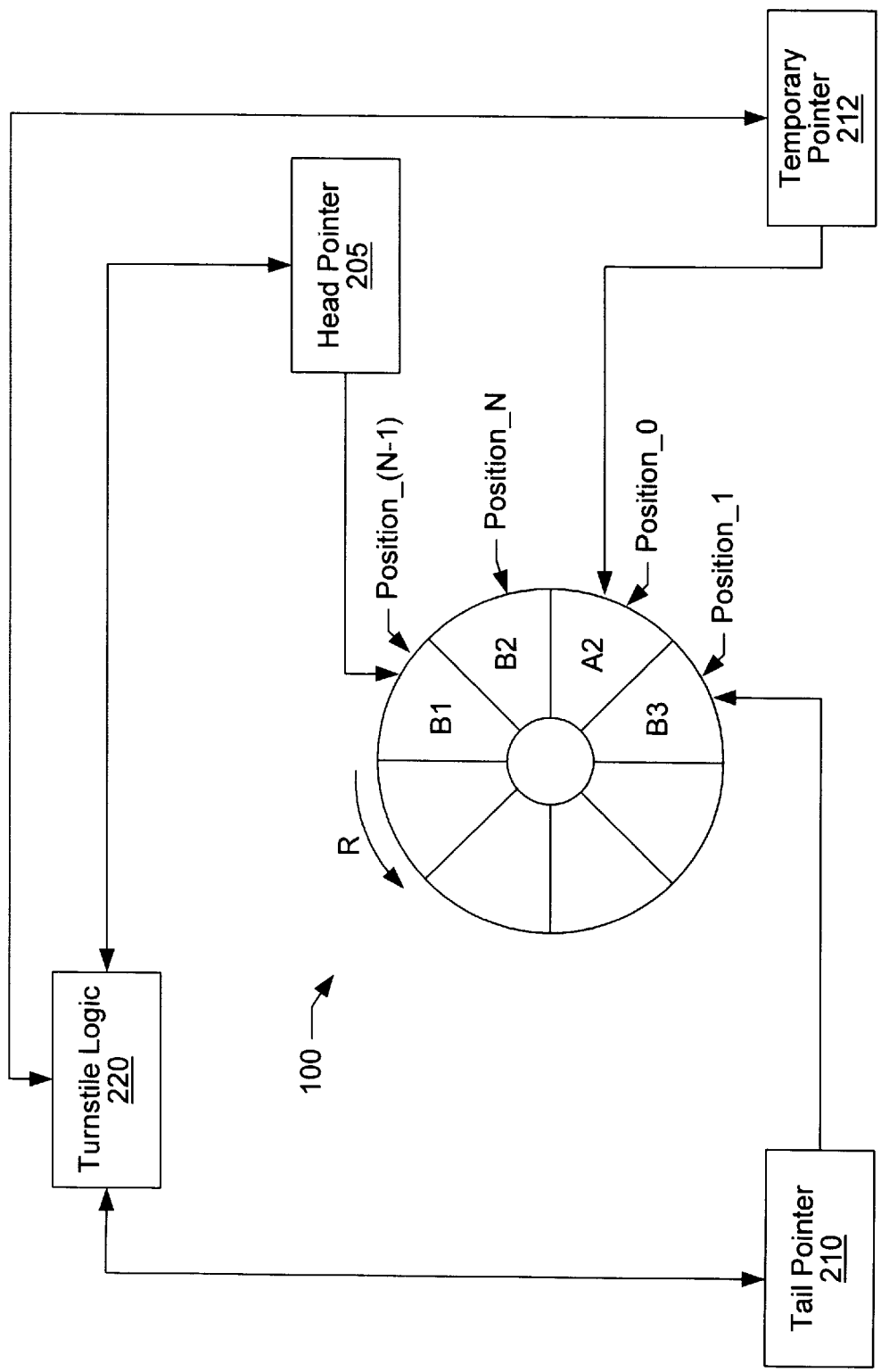
FIG. 2E is a block diagram of the circular memory structure of FIG. 2D after a second rotate operation in accordance with principles of the present invention.

Processing transfers to test step 312 (FIG. 3) in which turnstile logic 220 determines whether packet zero and the temporary packet are of the same set as represented in set identifier field 106 (FIG. 1A) of the respective data packets. If so, packet zero is not the oldest data packet of any particular ordered set stored within turnstile FIFO 100 and therefore cannot be dequeued without violating the sequence of data packets in the ordered set. Accordingly, processing transfers to step 316 in which turnstile logic 220 rotates turnstile FIFO 100 to consider the next data packet for dequeuing. Conversely, packet zero is still eligible for dequeuing and processing transfers to test step 314 which is described above. In this illustrative example, packet zero, i.e., data packet B2, and the temporary data packet, i.e., data packet B1, are of the same order set. Accordingly, processing transfers to step 316 and turnstile logic 220 rotates turnstile FIFO 100 to consider data packet A2 as packet zero as shown in FIG. 2E.

In a conventional FIFO which stores data packets of multiple ordered sets, data packet A2 would not be considered for dequeuing since data packets B1 and B2 are older and are still stored in the FIFO. However, by rotation of turnstile FIFO 100, data packet A2 can be considered for dequeuing. In step 302, turnstile logic 220 reads the tags of data packet A2. In test step 304, turnstile logic 220 determines that data packet A2 is not the head packet. Data packet B1 is still the head packet. In step 306, turnstile logic initializes temporary pointer 212 to point to data packet A2. In step 308, turnstile logic 220 decrements temporary pointer 212 such that data packet B2 is now the temporary data packet. In test step 312, turnstile logic 220 determines that packet zero, i.e., data packet A2, and the temporary data packet, i.e., data packet B2, are not of the same ordered set.

Accordingly, data packet A2 is still a candidate for dequeuing since no older data packet of the same set has been detected so far in turnstile FIFO 100. Processing therefore transfers to test step 314.

Figure 2F:
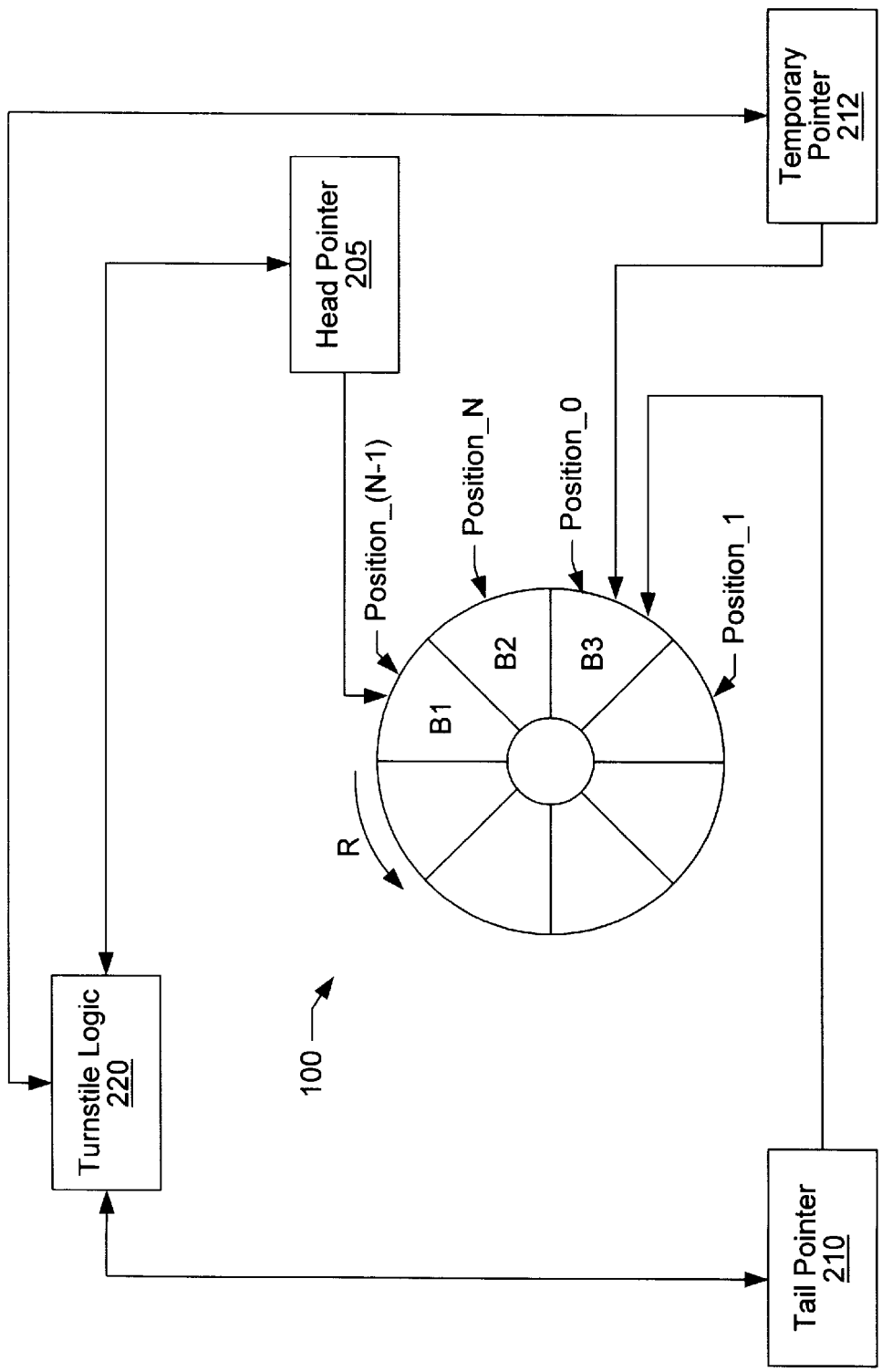
FIG. 2F is a block diagram of the circular memory structure of FIG. 2E after a dequeue operation accordance with principles of the present invention.

In test step 314, turnstile logic 220 (FIG. 2E) determines whether the temporary data packet is the head packet. If the temporary packet is the head packet, then all preceding data packets of turnstile FIFO 100 have been checked and, since processing has reached test step 314 each time, no older data packet of the same set as packet zero is stored within turnstile FIFO 100 and packet zero can therefore be safely dequeued. Processing accordingly transfers to test step 305 and step 320 for dequeuing in the manner described above. Conversely, if the temporary data packet is not the head packet, more data packets between packet zero and the head packet must be checked before packet zero can be safely dequeued. In this illustrative example, the temporary data packet is data packet B2 and is not the head packet. Accordingly, processing transfers to step 308 in which turnstile logic 220 decrements temporary pointer 212 such that data packet B1 is now the temporary data packet. Processing transfers to step 310 and through test step 312 to test step 314. Since the temporary data packet is now the head data packet, all preceding data packets in turnstile FIFO 100 have been checked in test step 312 and packet zero can now be safely dequeued. Processing therefore transfers to test step 305 which is described above. In this example, the recipient system of data packet A2 is ready to receive data packet A2 and processing transfers to step 320 in which data packet A2 is dequeued despite the presence in turnstile FIFO 100 of older data packets of another ordered set. The result of dequeuing data packet A2 in step 320 is shown in FIG. 2F.

Inclusion of Turnstile Logic 220 and Turnstile FIFO 100 in a Computer System

Figure 6:
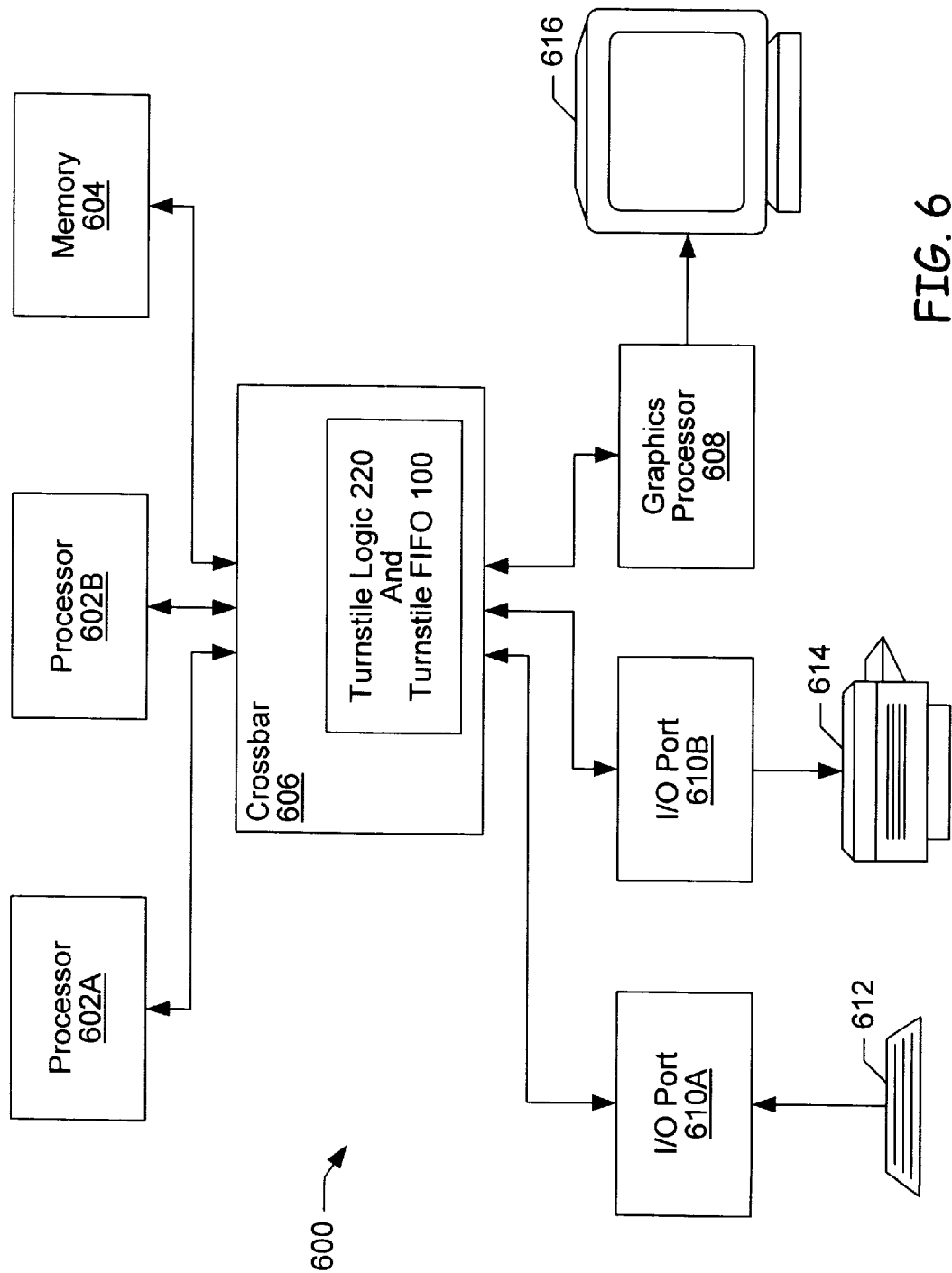
FIG. 6 is a block diagram of a computer system including a crossbar.

Computer systems today are required to perform ever increasing numbers of operations in ever decreasing amounts of time. For example, computer system 600 (FIG. 6) includes processors 602A–B and memory 604 which is coupled to processors 602A–B through a crossbar 606. Processors 602A–B fetch from memory 604 computer instructions and execute the fetched computer instructions. Processors 602A–B also read data from and write data to memory 604 and send data and control signals through crossbar 606 to I/O ports 610A–B and graphics processor 608 and receives data and control signals through crossbar 606 from I/O ports 610A–B and graphics processor 608 in accordance with fetched and executed computer instructions.

Memory 604 can include any type of computer memory and can include, without limitation, randomly accessible memory (RAM), read-only memory (ROM), and storage devices which include storage media such as magnetic and/or optical disks.

I/O port 610A receives input signals generated from a user input device 612 which can be any type of user input device including, without limitation, a keyboard, a numeric keypad, or a pointing device such as an electronic mouse, trackball, lightpen, touch-sensitive pad, digitizing tablet, thumb wheel, or joystick. User input devices 612 generates signals in response to physical manipulation by a user and I/O port 610A receives those signals and transmits them through crossbar 606 to processors 602A–B.

I/O port 610B receives control signals and data from processors 602A–B through crossbar 606 and causes display of the data on computer display device 614. Similarly, graphics processor 608 receives control signals and data from processors 602A–B through crossbar 606 and causes display of the data on computer display device 616. Computer display devices can be any type of computer display device including without limitation a printer, a cathode ray tube (CRT), a light emitting diode (LED) display, or a liquid crystal display (LCD).

As described above, crossbar 606 includes turnstile logic 220 and turnstile FIFO 100 which operate in the manner described above to manage multiple ordered sets of data packets. In one embodiment, each data packet represents a transaction between any of processors 602A–B, memory 604, graphics process 608, and I/O ports 610A–B. Turnstile FIFO 100 stores data packets in ordered sets according to the intended recipient of the represented bus transaction. Since all such transactions are represented in a single data structure, transactions intended for one system, e.g., processor 602B, can accumulate significantly without exceeding any maximum limit of queued transactions as long as empty slots in turnstile FIFO 100 remain. In other words, shortage and surplus of FIFO slots do not exist simultaneously in the manner described above with respect-to multiple, separate FIFO's. Furthermore, in the manner described above, transactions intended for one system does not block transactions for other systems. Accordingly, inefficiencies associated with idle systems in computer system 600 are reduced significantly.

In one embodiment, computer system 600 is the SPARCserver 450 computer system available from Sun Microsystems, Inc. of Mountain View, Calif. Sun, Sun Microsystems, and the Sun Logo are trademarks or registered trademarks of Sun Mico systems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

The above description is illustrative only and is not limiting. The present invention is limited only by the claims which follow.

What is claimed is:

1. An apparatus comprising:

a memory in which a memory structure is stored, the memory structure storing one or more data packets in a particular sequence in which the one or more data packets are added to the memory structure, wherein each of the one or more data packets belongs to a corresponding one of one or more ordered sets with membership in the one or more ordered sets corresponding to a destination for each of the one or more data packets; and memory management logic which is operatively coupled to the memory and which is configured to dequeue a selected one of the one or more data packets which belongs to a selected one of the one or more ordered sets;

wherein the memory management logic is configured to search for an intervening one of the one or more data packets which in sequence is positioned between the selected data packet and a head one of the one or more data packets and which belongs to the selected one of the one or more ordered sets, wherein the head one of the one or more data packets occupies the earliest position in the sequence of data packets stored in the memory structure; and wherein the memory management logic is configured to dequeue the selected data packet from the memory structure upon a determination that the intervening one of the one or more data packets does not exist in sequence in a position between the selected data packet and the head one of the one or more data packets.

2. The apparatus as recited in claim 1, wherein for each subject one of the one or more data packets stored in the memory structure in sequence in positions prior to the selected data packet up to and including the head data packet, the memory management logic is further configured to determine which subject one of the one or more ordered sets to which the subject one of the one or more data packets belongs.

3. The apparatus as recited in claim 2, wherein for each subject one of the one or more data packets stored in the memory structure in sequence in positions prior to the selected data packet up to and including the head data packet, the memory management logic is further configured to compare the subject one of the one or more ordered set to the selected one of the one or more ordered sets.

4. The apparatus as recited in claim 1, wherein the memory structure is a circular list.

5. The apparatus as recited in claim 1, wherein one or more additional data packets belonging to only a second one of the one or more ordered sets are also stored in the memory structure, wherein the memory management logic is further configured to dequeue the selected one of the one or more data packets by:

examining a next data packet between the selected data packet and the head one of the one or more data packets; and determining that the next data packet is not of the same ordered group as the selected data packet.

6. The apparatus as recited in claim 1, wherein the memory management logic is further configured to operate substantially perpetually to dequeue the selected data packet.

7. The apparatus as recited in claim 1, wherein the memory is a turnstile first in first out memory.

8. The apparatus as recited in claim 1, wherein the memory management logic is further configured to dequeue the data packet if a receiving device is ready to receive the selected data packet.

9. A system comprising:

a processor;

an apparatus coupled to the processor, the apparatus including:

a memory in which a memory structure is stored, the memory structure storing one or more data packets in a particular sequence in which the one or more data packets are added to the memory structure, wherein each of the one or more data packets belongs to a corresponding one of one or more ordered sets with membership in the one or more ordered sets corresponding to a destination for each of the one or more data packets; and memory management logic which is operatively coupled between the processor and the memory and which is configured to dequeue a selected one of the one or more data packets which belongs to a selected one of the one or more ordered sets;

wherein the memory management logic is configured to search for an intervening one of the one or more data packets which in sequence is positioned between the selected data packet and a head one of the one or more data packets and which belongs to the selected one of the one or more ordered sets, wherein the head one of the one or more data packets occupies the earliest position in the sequence of data packets stored in the memory structure; and wherein the memory management logic is configured to dequeue the selected data packet from the memory structure upon a determination that the intervening one of the one or more data packets does not exist in sequence in a position between the selected data packet and the head one of the one or more data packets.

10. The system as recited in claim 9, wherein for each subject one of the one or more data packets stored in the memory structure in sequence in positions prior to the selected data packet up to and including the head data packet, the memory management logic is further configured to determine which subject one of the one or more ordered sets to which the subject one of the one or more data packets belongs.

11. The system as recited in claim 10, wherein for each subject one of the one or more data packets stored in the memory structure in sequence in positions prior to the selected data packet up to and including the head data packet, the memory management logic is further configured to compare the subject one of the one or more ordered set to the selected one of the one or more ordered sets.

12. The system as recited in claim 9, wherein the memory structure is a circular list.

13. The system as recited in claim 9, wherein one or more additional data packets belonging to only a second one of the one or more ordered sets are also stored in the memory structure, wherein the memory management logic is further configured to dequeue the selected one of the one or more data packets by:

examining a next data packet between the selected data packet and the head one of the one or more data packets; and determining that the next data packet is not of the same ordered group as the selected data packet.

14. The system as recited in claim 9, wherein the memory management logic is further configured to operate substantially perpetually to dequeue the selected data packet.

15. The system as recited in claim 9, wherein the memory is a turnstile first in first out memory.

16. The system as recited in claim 9, wherein the memory management logic is further configured to dequeue the data packet if a receiving device is ready to receive the selected data packet.

* * * * *